United States Patent [19]

Hughes

[11] 4,298,986
[45] Nov. 3, 1981

[54] RECEIVER FOR PHASE-SHIFT MODULATED CARRIER SIGNALS

[75] Inventor: William C. Hughes, Scotia, N.Y.

[73] Assignee: General Electric Company, Schenectady, N.Y.

[21] Appl. No.: 106,451

[22] Filed: Dec. 26, 1979

[51] Int. Cl.³ .................. H04L 27/22; H04L 27/06; H03D 3/22

[52] U.S. Cl. ................................ 375/84; 375/97; 375/119; 329/124

[58] Field of Search .................. 375/80, 81, 82, 84, 375/106, 118, 119, 120, 97; 340/170, 171 R; 329/122, 124, 145; 328/133, 55; 330/294, 302, 303, 306

[56] References Cited

U.S. PATENT DOCUMENTS

| | | | |
|---|---|---|---|
| 3,196,352 | 7/1965 | Hopner et al. | 375/61 |
| 3,466,550 | 9/1969 | Wolf et al. | 375/82 |
| 3,611,142 | 10/1971 | Welti | 375/81 |
| 3,899,741 | 8/1975 | Brandt et al. | 329/122 |
| 3,944,723 | 3/1976 | Fong | 178/3 |
| 3,944,932 | 3/1976 | Fong | 455/271 |
| 3,973,087 | 8/1976 | Fong | 179/170 R |
| 3,973,240 | 8/1976 | Fong | 340/151 |
| 4,101,834 | 7/1978 | Stutt et al. | 340/310 A |
| 4,109,204 | 8/1978 | Kincaid et al. | 340/310 A |
| 4,135,181 | 1/1979 | Bogacki | 340/310 A |
| 4,161,720 | 7/1979 | Bogacki | 340/150 |
| 4,213,096 | 7/1980 | Daniel, Jr. | 329/124 |

Primary Examiner—Benedict V. Safourek
Attorney, Agent, or Firm—Geoffrey H. Krauss; James C. Davis; Marvin Snyder

[57] ABSTRACT

A receiver for recovering digital data from a phase-shift-modulated carrier in a data communications system, utilizes a relatively wide band-pass filter providing the received modulated signal to a pair of phase-locked loops. The first phase-locked loop provides a local oscillator signal tracking the exact frequency and phase of the received signal, which is itself locked to a multiple of a system-wide frequency. The second phase-locked loop acts as a synchronous data detector. Inversion circuitry, in the first phase lock loop, is controlled by the detected data output from the second phase-lock loop, for preventing the 180° phase modulation from disturbing the frequency-tracking local oscillator phase-lock loop.

23 Claims, 4 Drawing Figures

Fig. 3A

RECEIVER FOR PHASE-SHIFT MODULATED CARRIER SIGNALS

BACKGROUND OF THE INVENTION

The present invention relates to digital communications receivers, and, more particularly, to a novel digital communications receiver for recovering data phase-shift modulated on to a communications system carrier waveform.

It is known that digital information may be transmitted in a communications system by phase-shift modulation, wherein the phase of a carrier waveform is inverted, i,e, shifted by 180°, during each bit time interval in which a first binary data value is to be transmitted, and is maintained with the same phase as the immediately preceding bit time interval, when the remaining binary data value is to be sent in a particular bit time interval. It is also known that transmission of digital information may occur using a powerline, between a central facility and a multiplicity of remote locations each tied to the power distribution network, as the transmission medium. Powerline communication systems of this type are disclosed and claimed in U.S. Pat. Nos. 3,973,087 and 3,973,240, both issued Aug. 3, 1976; U.S. Pat. No. 3,944,723, issued Mar. 16, 1976; U.S. Pat. No. 4,135,181, issued Jan. 16, 1979; and U.S. Pat. No. 4,161,720, issued July 17, 1979, all assigned to the assignee of the present application and all incorporated herein in their entirety for reference. In powerline communication systems, wherein a powerline frequency (typically 60 Hertz (Hz.) in the United States) signal is present throughout the entire system, it is also known that the signal-to-noise ratio of the received signal can be greatly improved if the transmitted carrier signal frequencies are odd multiples of the first sub-harmonic of that powerline frequency. Methods and apparatus for realizing such improvements in signal-to-noise are described in claim U.S. Pat. No. 4,101,834, issued July 18, 1978; and U.S. Pat. No. 4,109,204, issued Aug. 22, 1978, both assigned to the assignee of the present application and incorporated herein by reference in their entirety.

In a data communications system in which the carrier is continuously present, even when the carrier is not modulated to transmit digital data to a receiving location, one presently known receiver filtering out both systematic pulse and random noise, to improve the signal-to-noise ratio, is described and claimed in U.S. Pat. No. 3,944,932, issued Mar. 16, 1976 to the assignee of the present invention and incorporated herein by reference in its entirety. This receiver utilizes at least one narrow band-pass commutating filter preceeded by at least one carrier-amplitude-limiting stage. The commutating filter requires a large number of precision resistance and capacitance elements, having relatively high cost, and also requires careful adjustment of a number of control elements during assembly, further adding to production cost. A receiver having high rejection of undesirable signals, but also having a relatively low production cost, is highly desirable.

BRIEF SUMMARY OF THE INVENTION

In accordance with the invention, a receiver for recovering digital data phase-shift-modulated on to a carrier waveform in a digital communication system, includes a relatively wide band-pass filter having an output providing a first signal to a linear mixer, forming a part of a phase-locked loop generating a loop signal having a frequency essentially locked to the received carrier frequency, and to another linear mixer having an output signal of level responsive to the phase difference between the received carrier frequency and the loop signal frequency provided by the phase-locked loop. A low-pass filter removes high frequency components of the phase difference output signal, from the second mixer, to recover the digital data on the modulated carrier. The recovered digital data is provided to circuitry recovering a baud synchronization signal therefrom, for providing local clock information in the receiver. An integrate-and-dump filter receives the recovered data and local clock waveforms for further improving the signal-to-noise ratio of the received data and provides this data to a latch. The latch holds each bit of received data, to provide the data in synchronizism with the local clock signal.

In a presently preferred embodiment, all required frequencies, establishing the timing sequences and operation of the receiver, are generated by frequency-arithemetic techniques. In an embodiment locked to a system-wide signal, such as the powerline frequency signal, all receiver frequencies are also locked to this powerline frequency (as is the frequency of the received carrier).

Accordingly, it is an object of the present invention to provide a novel receiver for recovering digital data modulating a carrier waveform in a digital communication system.

This and other objects of the present invention will become apparent upon consideration of the following detailed description, when taken in conjunction with the drawings.

DETAILED DESCRIPTION OF THE INVENTION

Figure 1:
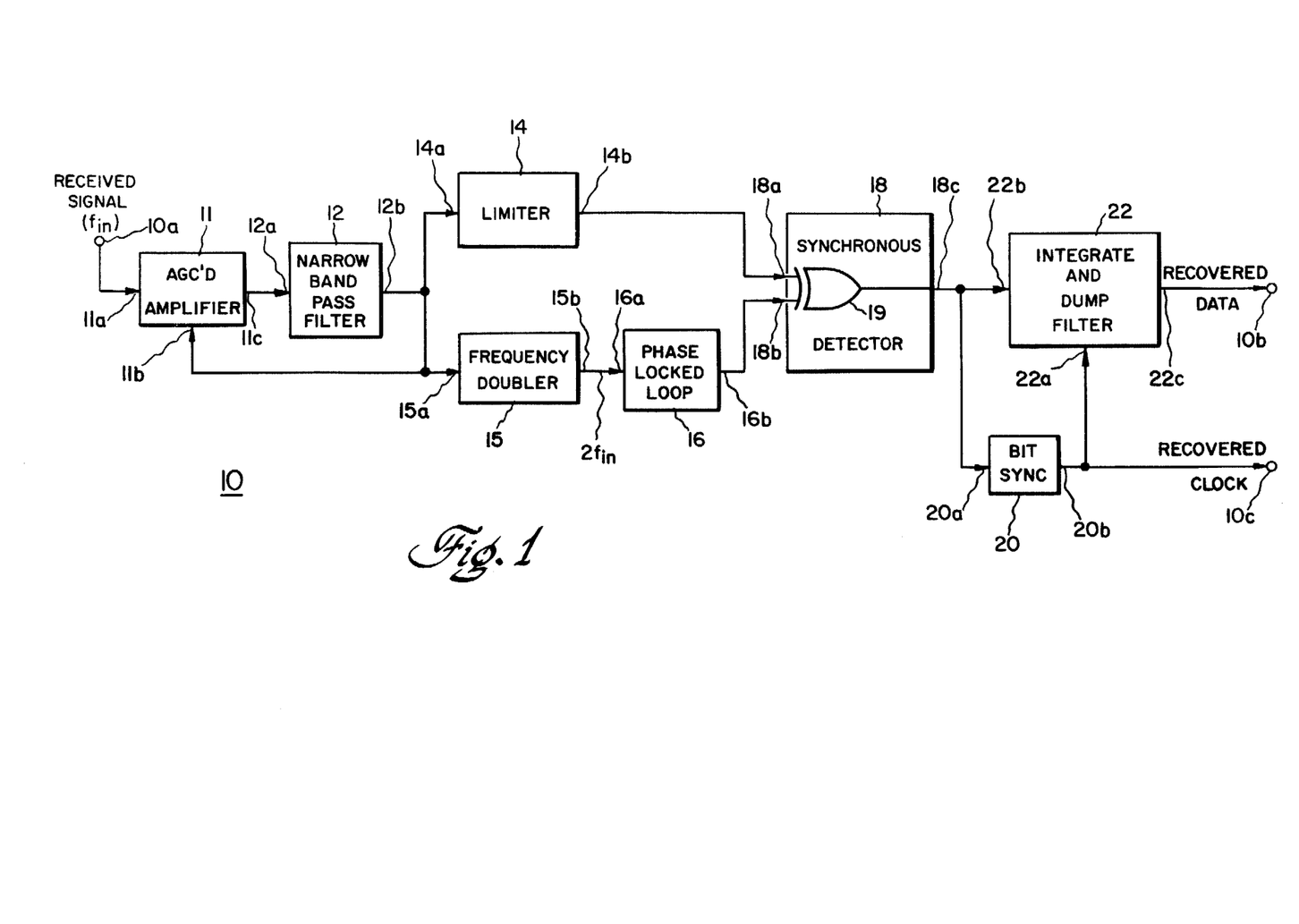
FIG. 1 is a block diagram of a receiver for recovering digital data from a digitally modulated carrier signal and utilizing a relatively high cost narrow band-pass filter.

Referring now to FIG. 1, a receiver 10 for recovering digital data which is 180° phase-shift-modulated onto the carrier waveform is shown. The carrier, which may be continuously present, is transmitted at a selected frequency $f_{in}$. The input frequency is advantageously integrally related to a system-wide frequency; in a powerline communication system, the input frequency advantageously will be an odd integer multiple of the powerline frequency first sub-harmonic. For purposes of illustration, the nominal 60 Hz. powerline frequency $f_L$ may be utilized as the system wide frequency and the carrier frequency $f_{in} = (2N+1)(f_L/2)$, where N is an integer. If N = 83, the nominal carrier frequency is 5010 Hz. It should be understood that the system-wide frequency may vary, e.g. the variation of the powerline frequency might, in some instances, be between upper and lower limits of 58.9 and 60.1 Hz. respectively, and that the carrier frequency advantageously is locked to the instantaneous value of the system-wide frequency and tracks the variations therein.

The carrier frequency waveform is advantageously modulated by shifting the phase thereof 180° whenever a transition in the modulating data bit stream occurs, e.g. from a first binary data value to a second binary data value, or vice-versa. The phase-shift-modulated carrier frequency waveform is coupled from the transmission medium, e.g. the powerline, via some form of coupling network (not shown) to the input 10a of the receiver. The received signal is applied to the input 11a of an amplifier means 11 having an AGC input 11b controlling the degree of amplification of the input signal at amplifier output 11c. The AGC'd amplifier output signal is applied to the input 12a of a narrow band-pass filter means 12. Filter 12 may be a commutating band-pass filter, such as the commutating filter 20 described in the aforementioned U.S. Pat. No. 3,944,932, or other known narrow band-pass filtering means having a band-pass on the order of 150 Hz. for the amplified, filtered signal at the output 12b thereof. Filter output 12b is connected back to the AGC control input 11b of the amplifier, to prevent amplifier 11 from saturating for large amplitude received signals, and is also connected to the input 14a of a limiter means 14 and the input 15a of a frequency doubler means 15. The output 15b of frequency doubler 15 is connected to the reference input 16a of a phase-locked loop means 16, which provides a signal at its output 16b phase-locked to the frequency $f_{in}$ of the received carrier. Th limiter means output 14b is connected to one input 18a of a phase detector 18, which may include an exclusive-OR gate 19. The remaining input 18b of the synchronous detector is connected to phase-locked loop output 16b. Frequency doubler 15 functions to remove the phase modulation from the received carrier to phase-lock loop means 16 to the input carrier frequency, whereby the output waveform from loop means 16 serves as a reference frequency waveform for synchronous detection of the phase-shift modulated received carrier. The signal at synchronous detector output 18c is the recovered digital data originally modulated onto the carrier of the signal received at input 10a. By use of frequency doubler 15, the receiver is made insensitive to 180° phase changes and, because the carrier is continuously received, loop means 16 lock-time is not critical and the effective bandwidth of the phase-locked loop can be considerably less than the receiver data bandwidth.

The recovered digital modulation bit stream at synchronous detector output 18c is applied to the input 20a of a bit synchronization means, which may be a phase-locked loop locked to the data bit stream frequency. The bit synchronization frequency waveform, at bit synchronization means output 20b, is applied to the control input 22a of an integrate-and-dump filter means 22, receiving the recovered digital bit stream information at a second input 22b, from synchronous detector output 18c. The integrate-and-dump (I&DF) filter 22 further reduces noise and other extraneous signals, particularly harmonics of the system-wide, e.g. 60 Hz., signal. Therefore, the recovered data signal of I&DF means output 22c is the digital data recovered from the carrier, having a relatively high signal-to-noise ratio and, therefore, a very small error rate. It will be seen, however, that such a receiver may be extremely costly to implement, due to the number of precision components required particularly in narrow band-pass filter means 12, and the careful adjustment of variable components therein. The relatively large cost of labor and material is undesirable. A digital communication system receiver which does not require a very narrow bandwidth filter and has a significantly reduced cost, without significant sacrifice of performance, is highly desirable.

Figure 2:
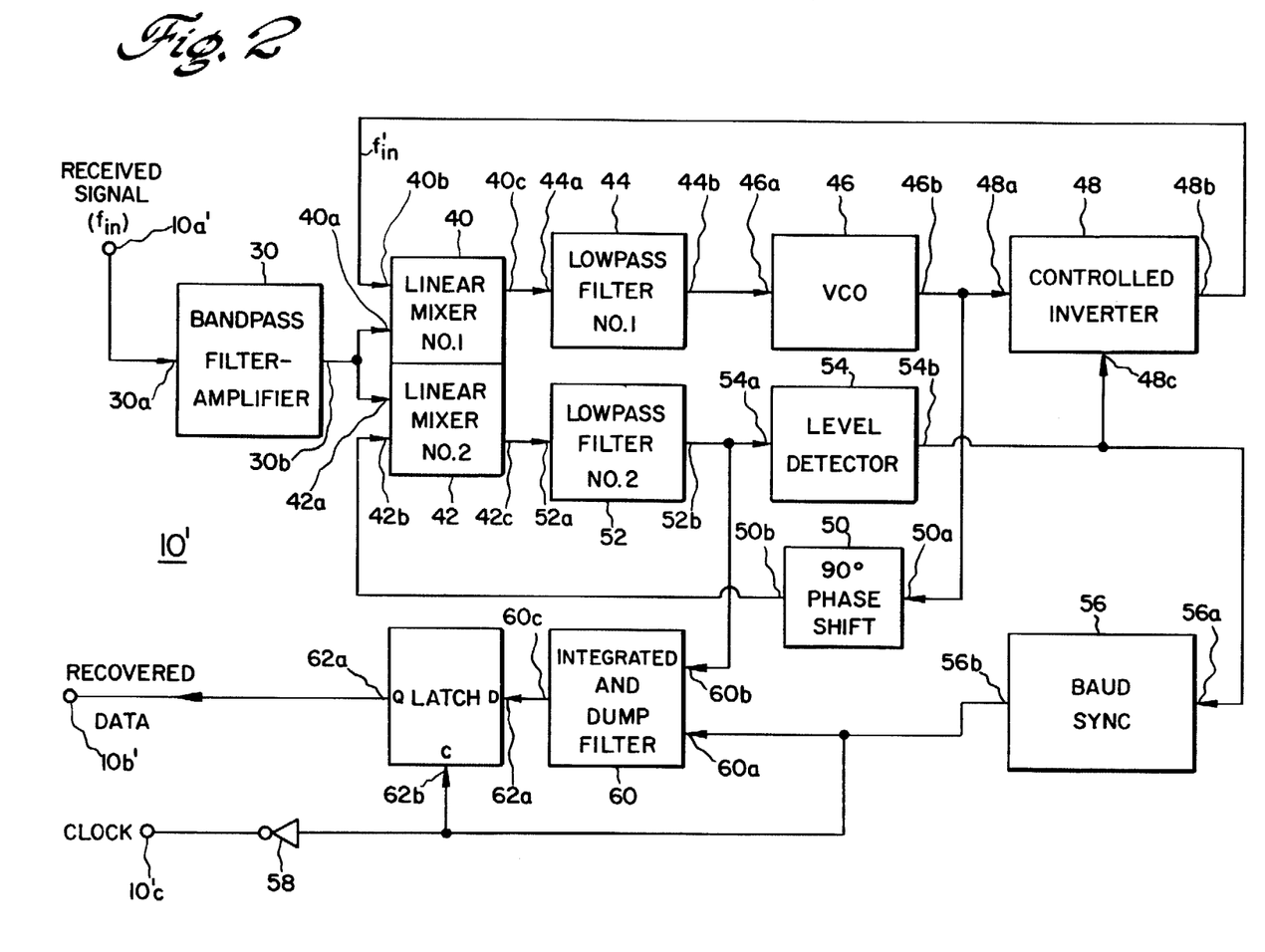
FIG. 2 is a block diagram of a novel receiver in accordance with the principles of the present invention.
Figure 3A:
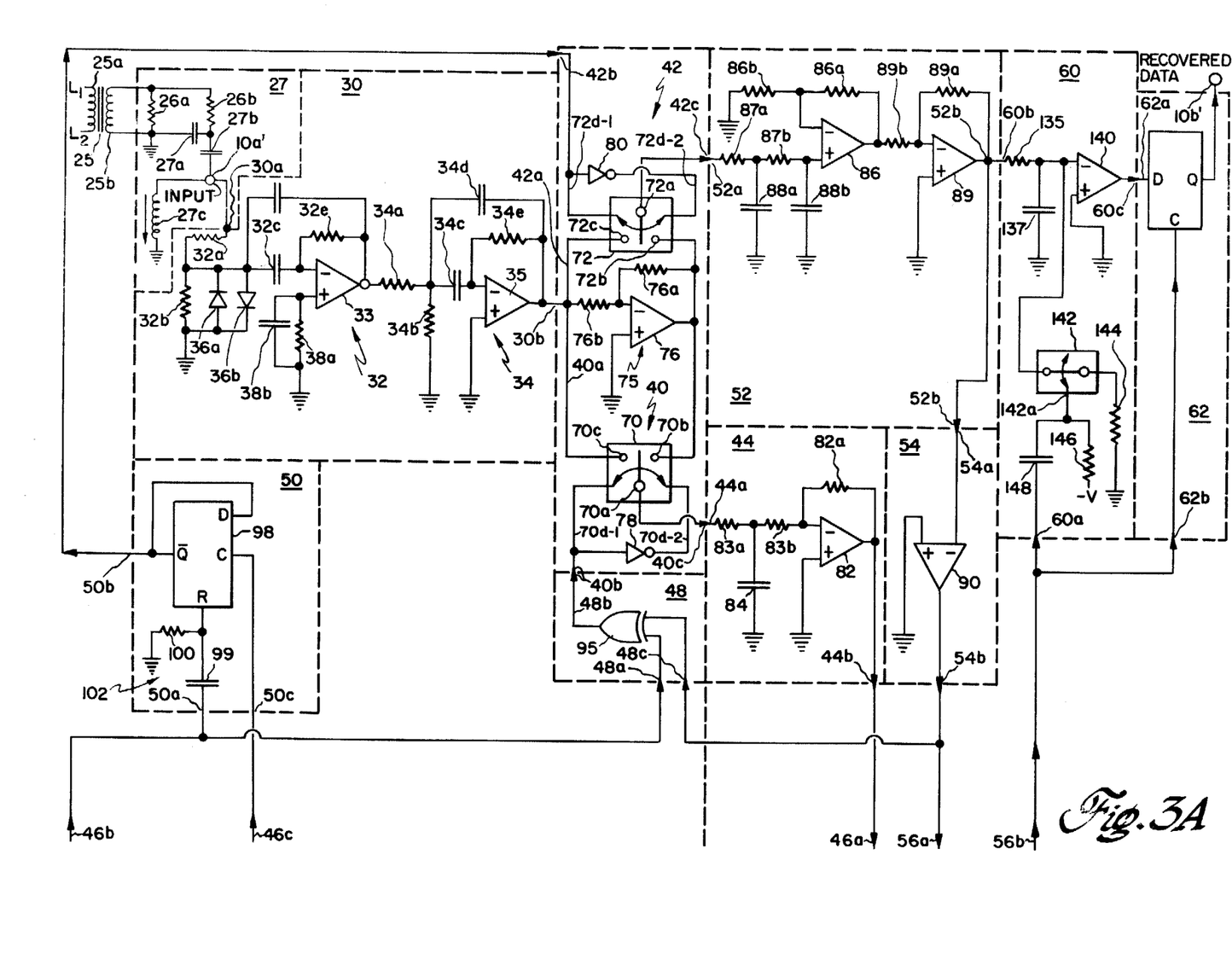
FIGS. 3a and 3b are interrelated parts of a schematic block diagram of the receiver of FIG. 2, and useful in understanding the principles of operation thereof.
Figure 3B:
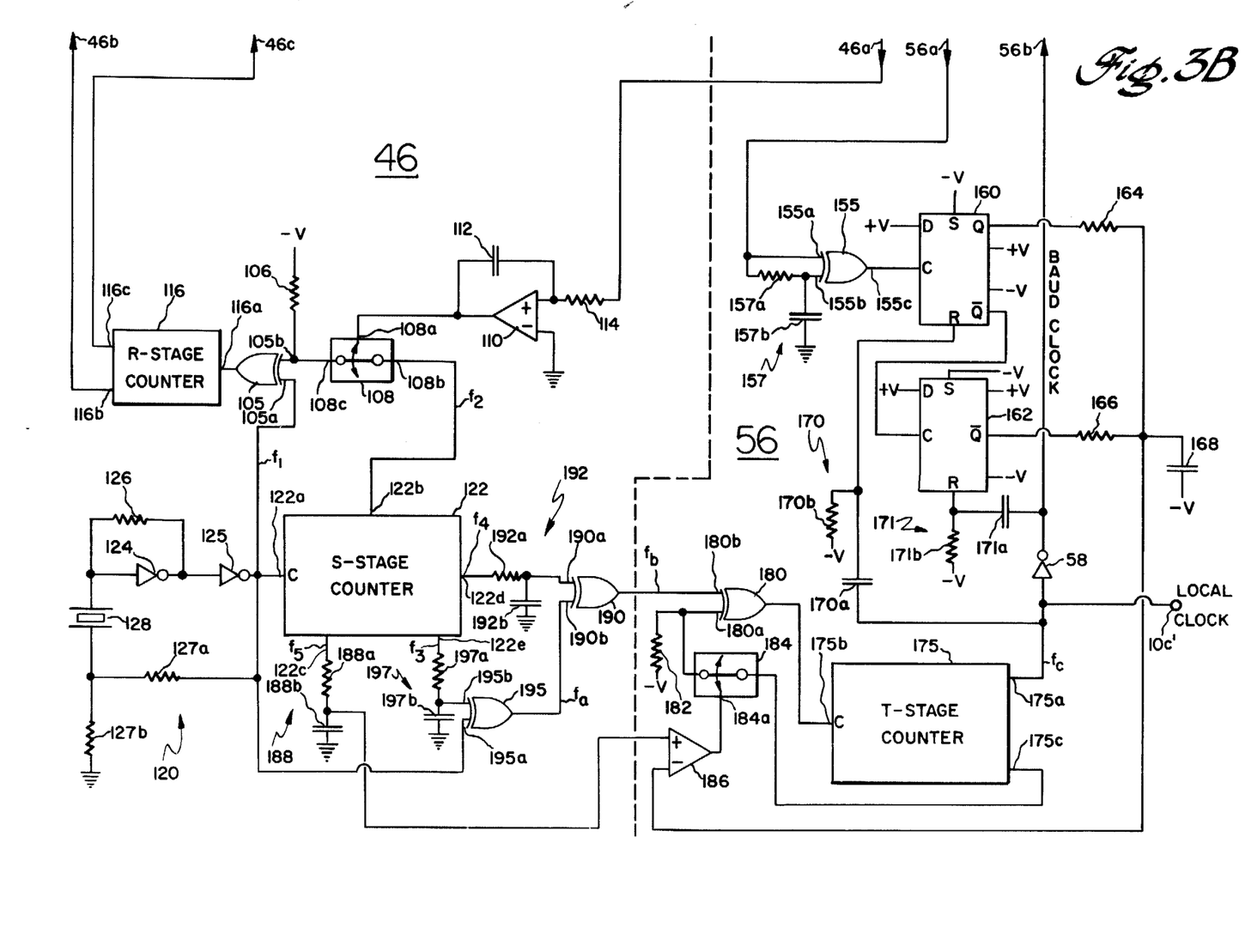

Referring now to FIGS. 2, 3a and 3b, a presently preferred embodiment of my novel digital communication system receiver 10' is illustrated. The digitally modulated, e.g. 180° phase-shift-modulated, signal is coupled to receiver 10' from a transmission medium, e.g. a powerline, by suitable means, such as by a transformer 25 having a primary winding 25a coupled between powerlines $L_1$ and $L_2$ and a secondary winding 25b providing the carrier signal across a resistance 26a. A resistance 26b is in series with impedance matching input filter 27 consists of capacitances 27a and 27b and a tuning inductance 27c. *The inductance 27c* and capacitance 27b are series-resonant at the carrier frequency, (e.g. 5010 Hz.) to attenuate the lower-frequency system-wide signal (e.g. 60 Hz.) The filter 27 provides a received signal at input terminal 10a', connected to the input 30a of a band-pass filter-amplifier means 30. The amplification of means 30 is selected such that the signal at the output 30b thereof will not be saturated at the highest amplitude of signal expected to be received at input 10a'. The band-pass filter characteristics of means 30 is that of a relatively wide-band filter having the desired center frequency and a 60 dB attenuation at a frequency of approximately three times the center frequency. For example, and by way of illustration only, band-pass-filter-amplifier 30 has a center frequency of 5010 Hz. and an attenuation of 60 dB at about 15 KHz., compared with the 60 dB attenuation requirement at about 6.6 KHz. of the narrow band-pass filter 12 (of FIG. 1) having the same 5010 Hz. center frequency.

The relatively wide-band filtering characteristics of amplifier 30 do not require the use of complex filters. In one presently preferred embodiment, filter-amplifier 30 comprises a pair of series connected operational amplifier band-pass filters 32 and 34. Each band-pass amplifier includes an input series resistance 32a and 34a, respectively, and an input shunt resistance 32b and 34b, respectively. A pair of back-to-back diodes 36a and 36b are connected in parallel across the input shunt resistance 32b of first band-pass filter amplifer 32, to prevent overload of the operational amplifier thereof. The junction between respective input resistors 32a and 32b, or 34a and 34b, is coupled to the inverting input of the associated operational amplifier 33 or 35 via a first filter capacitance 32c or 34c, and coupled to the output of the same associated amplifier by a second filter capacitance 32d or 34d, respectively. A feedback resistance 32e or 32e, respectively, is connected between the inverting input and output of the associated operational amplifier 33 or 35. A compensation network 38, including a resistance 38a in parallel with a by-pass capacitance 38b, is coupled between ground potential and the non-inverting input of the first operational amplifier 33, while the non-inverting input of second operational amplifier 35 is connected to ground potential. The output of second operational amplifier 35 is connected to band-pass filter amplifier means output 30b.

A first input 40a and 42a, respectively, of first and second linear mixers 40 and 42 are connected in paralle to the filter-amplifier output 30b. First linear mixer 40 has a second input 40b receiving an internally generated waveform of frequency $f_{in}'$, which frequency is to be locked to the carrier frequency $f_{in}$ of the received signal. A first mixer output 40c provides signal having an amplitude responsive to the phase difference of the signals at first and second mixer inputs 40a and 40b. First mixer output 40c is coupled to the input 44a of a first lowpass filter means 44, having its filtered output 44b connected to the control voltage input 46a of a voltage-controlled oscillator 46. The voltage-controlled oscillator (VCO) output 46b provides a waveform substantially at the feed-back frequenc $f_{in}'$. The VCO output 46b is coupled to the input 48a of an inverter 48, providing a 180° phase-shift at the output 48b thereof and connected back to first mixer second input 40b to provide a properly-phased waveform of frequency $f_{in}'$ thereto. The voltage-controlled oscillator (VCO) output 46b is also connected to the input 50a of a 90° phase-shift network 50, having its output 50b connected to second mixer second input 42b. First and second mixers 40 and 42 are linear analog mixers utilized to assure that no additional saturation (or limiting) is required or present preceding the mixers, thereby preventing generation of intermodulation products which might produce undesirable signals in the band-pass of the receiver. First low-pass filter means 44 is a single pole low-pass filter having a cutoff frequency of about 30 Hz., facilitating a reasonably narrow locking range and relatively long settling time, but providing high noise immunity in highly cost effective manner. The VCO output is inverted, by inverter means 48, under control of a signal, at inverter means second input 48c, responsive to the data bit transitions of the received digital communication; as the modulated carrier phase is shifted at the instant of time separating two adjacent bit time intervals, the detected phase transitions are utilized to invert the VCO output waveform for application to first mixer second input 40b, thus preventing disturbance of the operation of the phase-lock-loop formed of mixer 40, low pass filter 44, VCO 46 and inverter 48.

The data bit transition information at inverter input 48c is derived by coupling the second mixer output 42c through a second low-pass filter means 52 to the input 54a of a level detector 54. The output 54b of the level detector changes logic level responsive to each transition of the data bit stream modulating the received carrier. The data bit stream transitions, from level detector output 54b, are also connected to the input 56a of a baud synchronization means 56, for recovery of the exact digital modulation timing information. This timing information is buffered by an inverter means 58 to provide the local clock signal at receiver output 10c' and is also connected to a first input 60a of the integrate-and-dump filter (I&DF) means 60, having a second input 60b connected to the second low-pass filter means output 52b. The I&DF means 60, which may be the integrate-and-dump filter means utilized as a main data detector 72 in the aforementioned U.S. Pat. No. 4,101,834, and the like, provides additional attenuation of the system-wide, e.g. 60 Hz., harmonics and harmonically-related noise, of the filtered digital data at the output 60c thereof. Output 60c is connected to the data input 62a of a latch means 62, having a clock input 62b, for clocking the filtered data to appear at the receiver recovered data output 10b' with fixed relation to an associated recovered clock pulse appearing at recoverd clock output 10c'.

Specifically, first and second mixers 40 and 42 each utilize a single-pole, double-throw switch means 70 and 72, respectively, having the common terminal 70a and 72a, respectively, thereof connected to the respective mixer outputs 40c and 42c. A first selectable terminal 70b or 72b, respectively, is connected to the output of an inverter 75, comprising an operational amplifier 76 having its non-inverting input connected to ground potential and having its inverting input connected to the output thereof by a feedback resistance 76a. The inverting input of inverter operational amplifier 76 is connected to the filter-amplifier means output 30b via an input resistance 76b. A second selectable terminal 7c or 72c, respectively, of the respective switch means 70 or 72, is connected to the associated first mixer input 40a or 42a. The first mixer inputs are connected in paralle, to inverter input resistance 76b and filter-amplifier means output 30b. Each of switch means 70 and 72 has first and second selector inputs 70d-1 and 70d-2, or 72d-1 and 72d-2, respectively, controlling the connection of the respective common terminals 70a or 72a respectively to first selectable terminals 70b or 72b and to second selectable terminals 70c and 72c. First switch means first selector input 70d-1 is connected to first mixer second input 40b and to the input to an inverter 78 having its output connected to first switch means second selector input 70d-2. Second switch means first selector input 72d-1 is connected to second mixer second input 42b and to the input of another inverter 80 having its output connected to second switch means second selector input 72d-2. Thus, each of the mixer switching means has the common terminal thereof alternately connected to receive the filter-amplifier true and inverted waveforms, at a switching rate determined by the signals appearing at the respective mixer second inputs 40b and 42b. This alternate-switching action provides a highly linear frequency-mixing characteristic to the waveforms at the mixer outputs 40c and 42c, respectively.

First low-pass filter means 44 is, as previously mentioned, a single-pole low-pass filter, utilizing an operational amplifier 82 having its non-inverting input connected to ground potential and having its inverting input connected to its output, and to the low-pass filter means output 44b, via a feedback resistance 82a. The operational amplifier input resistance is comprises of a pair of series-connected input resistances 83a and 83b, connected between the first low-pass filter input 44a and the inverting input of operational amplifier 82, and having a filter capacitor 84 connected from the resistance junction to ground potential.

The second low-pass filter means 52 includes a pair of operational amplifiers 86 and 89. First operational amplifier is connected as an active low-pass filter, by connection of a feed-back resistance 86a between the inverting input and output thereof and the connection of a second feedback resistance 86b between the inverting input and ground. The non-inverting input of operational amplifier 86 is connected to second low-pass filter input 52a by a pair of series-connected resistance elements 87a and 87b. A two-pole low-pass filtering function is provided by the connection of a first filter capacitance 88a from the junction between the resistance elements 87a and 87b to ground potential, and the connection of a second capacitive filter element 88b from the non-inverting input to ground potential. The values of resistances 87a and 87b and capacitance elements 88a and 88b are selected for a cut off frequency in the aforementioned 15–30 Hz. range. Operational amplifier 89 is utilized as an inverter, having a feedback resistance 89a coupled between the inverting input and output thereof and having an input resistance 89b coupled between the inverting input and the output of operational amplifier 86. The output of amplifier 89 forms the second low-pass filter means output 52b, to which the input 54a of level detector 54 is connected. Level detector 54 is an operational amplifier 90, having its non-inverting input connected to ground potential and having its inverting input connected to the second low-pass filtered output. The output of operational amplifier 90 is the level detector output 54b. As feedback is not used with operational amplifier 90, it operates at its full gain and functions as a comparator, having the output logic level thereof established by the magnitude of the input level (from second low-pass filter output 52b) with reference to ground potential.

Inverter 48 is comprised of a two-input exclusive-OR gate 95, having one input coupled to second inverter input 48c (itself connected to the ouput 54b of the level detector) and having the output thereof connected to inverter output 48b and thence to first mixer second input 40b. The remaining exclusive-OR gate input is first inverter input 48a, which is coupled in parallel to the input 50a of the 90° phase-shift means 50. Phase-shift means 50 is comprised of a type-D flip-flop logic element 98 having a data D input connected to an inverted $\overline{Q}$ output, at the phase-shift means output 50b, and having a reset R input connected through a coupling capacitance 99 to be in electrical parallel connection with inverter first input 48a, at the VCO output 46b. The reset input of flip-flop element 98 is also connected through a resistor 100 to a source of negative operating potential ($-V$), with capacitance 99 and resistance 100 forming a differentation network 102. Another input 50c of the phase-shift phase means is connected to the clock C input of flip-flop element 98 and receives a multiple of the VCO frequency, at a VCO output 46c, to assure 90° phase-shirt through the flip-flop element.

VCO 46 includes a frequency-adder formed about a two-input exclusive-OR gate 105, having a first input 105a receiving a first frequency $f_1$ signal and a second input 105 b having a resistance 106 to ground potential. Second input 105b is connected to a switch means 108 and will selectively receive an essentially zero frequency waveform when switch means 108 is open, or a waveform having a frequency $f_2$, much less than first input frequency $f_1$, when switch means 108 is closed. The action of switch means 108 is controlled by the level of a signal at a control input 108a thereof. The control signal is provided at the output of a switch-driving operational amplifier 110, having its inerting input connected to ground potential and having its non-inverted input connected both to the output thereof by a capacitor 112 to the first low-pass filter means output 44b via an input resistance 114. The output of gate 105 is connected to the count C input 116a of a R-stage counter 116, having a first output 116b forming the first VCO output 46b and having a second output 116c forming the second VCO output 46c.

The first and second frequency $f_1$ and $f_2$ signals required by VCO 46 may be provided by a crystal-control oscillator 120 and associated S-stage counter means 122, or by existing circuitry within the receiver. Suitable frequency-synthesis circuitry is shown in co-pending application Ser. No. 103,032, filed Dec. 13, 1979, although other forms of frequency-establishing circuitry are known to the art. Oscillator 120 includes a pair of series-connected inverters 124 and 125, having a feedback resistance 126 connected from output to input of first inverter 124 and a pair of series-connected resistors 127a and 127b connected from the output of the second inverter 125 to ground, with a frequency-deter-mining crystal element 128 connected between the input of inverter 124 and the junction of resistors 127a and 127b. The frequency of crystal element 128 is chosen to provide the desired frequency $f_1$ signal at the output of inverter 125. Illustratively, frequency $f_1$ is $2^R$ times a frequency ($f_x$) slightly less than the frequency $f_{in}$ of the incoming modulated carrier wave. Specifically, for a carrier frequency $f_{in}$ of 5010 Hz., and a counter 116 having R=four stages, first frequency $f_1$ is about 80080 Hz. (and frequency $f_x$ is 80080 Hz. $\div 2^R = 5005$ Hz., less than 5010 Hz.). The output of crystal-control oscillator 120 is applied to the count C input 122a of S-stage counter 122. The frequency of the waveform at a first counter output 122b taken from the $f_1$-th counting stage is, if counter 122 is an S-stage binary ripple counter, equal to $f_1/2^{S_1}$, e.g. about 156.4 Hz. if $S_1 = 9$ and $f_1 = 80080$ Hz. Thus, a substantially square waveform having second frequency $f_2$ is supplied to terminal 108b of the switch means and is periodically connected to switch means terminal 108c, at gate input 105b. The number of transitions in the waveform at the output of gate 105 is the sum of the input transitions, in any unit of time, on each of gate inputs 105a and 105b, due to the exclusive-OR gate producing an output transition at any time either input transition. The delay through counter 122 is sufficient to assure that transitions do not occur at both inputs 105a and 105b simultaneously; some of the output transitions might be lost if both inputs were simultaneously received waveform transitions. It should be noted that similar delays are introduced in other portions, described hereinunder, of the receiver, to assure that a plurality of waveforms do not simultaneously undergo transition. When switch means 108 is open, the waveform at the output of gate 105 has the crystal oscillator frequency $f_1$ of 80080 Hz., which is divided down by $2^R = 16$ and appears at first VCO output 46b at a frequency of 5005 Hz. The second VCO output 46b is taken from the third stage of the counter and thus has a frequency twice that of the waveform frequency at output 46b, e.g. output 46c has a waveform frequency of 10010 Hz. The appearance of a first positive transition at output 46b resets the Q output 50b of flip-flop element 98 to a logic 1 level, which is then switched to a logic zero level by the appearance of the next leading edge of the VCO output 46c waveform coupled to the clock C input of the flip-flop element; as the clock input is enabled by the rising edge of a synchronous waveform having twice the frequency of the waveform acting to reset element 98, the waveform at output 50b is at the same frequency as VCO first output 46b, but with a consistent 90° phase difference therefrom.

The VCO waveform, being slightly lower in frequency than the received carrier waveform, will gradually fall behind a 90° phase relationship with the received frequency and, as this is the waveform applied to second mixer second input 48a, the D.C. component of the waveform at mixer output 40c will decrease in value. The voltage across filter capacitor 84 will charge in the negative direction, be amplified and inverted by operational amplifier 82. The now-increasing voltage is level-detected by operation amplifier 110, until, when a sufficiently increased voltage amplitude is present, switch means input 108a is enabled to close the connection between switch terminals 108b and 108c supplying the second frequency $f_2$ waveform to gate second input 105b. Gate 105 now has an output waveform having a frequency equal to the sum of the first and second frequencies, e.g, $f_1 + f_2 = 80080$ Hz. $+ 156.4$ Hz. $= 80236.4$ Hz. This higher frequency gate output waveform is applied to counter 116, whereby the waveforms at the first and second outputs 46b and 46c thereof are respectively increased, e.g. to about 5014.8 Hz. and about 10029.6 Hz. The waveform at phase-shift means output 50b, with switch means 108 closed, has a frequency slightly greater than the received carrier frequency, by about the same frequency difference as between the carrier frequency and the phase-shift means output frequency with switch means 108 open, and has a 90° phase-shift relative to the identical frequency waveform at VCO output 46b. The phase of this higher frequency waveform will then gradually overtake the phase of the received carrier waveform, until the VCO waveform begins to lead the 90° relationship. The first mixer D.C. output voltage now increases, and after filtering and inversion in low-pass filter means 44, and level-detection means 54, is a decreasing magnitude signal at switch means control input 108a. When the phase error is large enough, the switch means input level has decreased sufficiently to open switch means 108, and reestablish the VCO output 46b waveform frequency at the lower one of the two VCO frequencies. The VCO signal is thus nominally at the frequency $f_{in}$ of the received carrier and "hunts" around a 90° phase relationship therewith. The magnitude of the error signal required for activating switch means 108, and therefor the stability of the 90° phase-shifted VCO signal to the second mixer, is established by the magnitude of feedback resistance 82a. Feedback capacitor 112, from the output to the non-inverting input of operational amplifier 110, prevents undesirable voltage transients, due to transition in the first mixer output waveform, from being coupled to switch means 108 and producing extraneous counts in the output waveform of frequency-adder gate 105.

The waveform at second low-pass filter output 52b is the recovered modulation, which is "squared-up" by level detector 54. The sharply-transitioning recovered ditital modulation waveform is applied to input 54a of baud synchronization means 56, which generates the baud clock signal for introduction to I&DF input 60a and latch clock C input 62b.

The recovered ditital data modulation waveform at output 52b is applied to I&DF input 60b and causes a current to flow through an integration resistance 135 to charge integration capacitance 137. The inverting input of an operational amplifier 140 is connected to the junction between integration resistance 135 and integration capacitance 137, while the non-inverting input of the operational amplifier is connected to ground potential; the amplifier output is the I&DF filter output 60c. A single-pole, single-throw switch means 142 is connected in series with a discharge resistance 144, across integration capacitor 137. A switch means control input 142a is returned to a negative operating potential, $-V$, through a resistance 146 and is connected to a coupling capacitance 148 to the filter first input 60a at which the baud synchronization means baud clock output signal is presented. The baud clock synchronizing signal is also present at the clock input 62b of a D-type flip-flop logic element 62, having its data D input 62a connected to the output of operational amplifier 140 and having its Q output 62c connected to the recovered data output 10b' of the receiver.

The baud clock signal at the output of baud synchronization means is provided by coupling the recovered modulation signal, at the second low-pass filtered means output 52b, through level detector means 54, directly to one input 155a of a two-input exclusive-OR gate 155. The remaining input 155b is connected to the junction between a series resistance 157a and a shunt capacitance 157b of a time delay network 157. First and second D-type flip-flop logic elements 160 and 162 (which may be part of a CMOS 4013 integrated circuit and the like) have their data D inputs connected to a positive logic level potential source and have their set S inputs connected to a negative potential source, for the disabling of the set S inputs thereof. The first flip-flop element 160 has a count C input connected to the output of gate 155 and has an inverted $\overline{Q}$ output connected to the count C input of flip-flop element 162. The true $\overline{Q}$ output of flip-flop logic element 160 is connected to the inverted Q output of the second flip-flop element 162 through a pair of series-connected resistance elements 164 and 166, of substantially equal resistance magnitude. An integration capacitance 168 is connected to negative operating potential from the junction between resistance elements 164 and 166. The reset R input of first flip-flop element 160 is connected, via a differentiation network 170, comprising a differentating capacitance 170a and a shunt resistance 170b, to the input of inverter 58, at receiver recovered clock terminal 10c'. The reset R input of second flip-flop element 162 is coupled, via a second differentiation network 171, comprising a series differentiation capacitance 171a and a shunt delay resistance 171 b to the output of inverter 58, from which the baud clock signal output 56b is taken. A local clock waveform, having a nominal frequency, e.g. 30 Hz., equal to the baud frequency of the received data stream, is provided at the output 175a of a T-stage counter means 175, coupled to the local clock terminal 10c ', Counter 175, which may be a CMOS 4040 integrated circuit and the like (which may also be used for counter 116), has a clock C input 175b and an additional output 175c. Clock input 175a is connected to the output of a first two-input exclusive-OR gate 180. (All exclusive-OR gates may be part of a CMOS 4070 integrated circuit and the like). A first input 180a is connected to a source of negative potential through a resistance 182 and is selectably connected, via a single-pole, single-throw switch means 184, to a second counter output 175c. A control input 184a of switch means 184 is activated by the output of a level-detecting operational amplifier 186, having its inverting input connected to the junction between resistances 164 and 166. Another output 122c of S-stage counter means 122 is connected via an integrating network 188 including a series integrating resistor 188a and a shunt integrating capacitance 188b, to the non-inverting input of amplifier 186. A one exclusive-OR gate input 180b is connected to the output of a second two-input exclusive -OR gate 190. A first input 190a is connected to a third output 122d of the S-stage counter means, via a time delay network 192, including a series delay resistance 192a and a shunt delay capacitance 192b. A second gate input 190b is connected to the output of a third two-input exclusive-OR gate 195, having a first input 195a connected to the output of crystal-control oscillator 120 and having a second input 195b connected to a fourth output 122e of the S-stage counter means 122, via another time-delay network 197, having a series delay reistance 197a and a shunt delay capacitance 197b.

In operation, gate 155 and flip-flop elements 160 and 162 form a phase detector receiving a local clock nominal frequency signal at the output of counter 175. The counter output waveform frequency is controlled by switch means 184 to be slightly greater than, or slightly less than, the frequency of the transitions of the received digitally-modulated carrier. This is accomplished by adding the frequency $f_1$, e.g. 80080 Hz. of the oscillator to the first sub-harmonic thereof. The first sub-harmonic waveform, of frequency $f_3$, e.g. 40040 Hz. is provided at the S-stage counter output 122e, after undergoing counting in a single binary counter stage. Timer network 197 is utilized to prevent transitions of the waveforms at gate inputs 195a and 195b from occurring simultaneously whereby the waveform at the output of gate 195 has a number of transitions equal to the sum of transitions of the two input waveforms, i.e. a frequency $f_a = f_1 + f_3$, e.g. 120120 Hz. The frequency $f_a$ of the gate 195 output waveform is added in gate 190 to the frequency of the waveform at counter output 122d. Illustratively, counter output 122d is taken from the fifth (S=5) binary counting stage thereof, having a frequency $f_4$ (e.g. 80080 Hz. $\div 2^5 = 2502.5$ Hz.). Time delay network 92 is utilized to delay the $f_4$ frequency waveform so that the transitions at both inputs 190a and 190b of gate 190 are not synchronous, and therefore provide the gate 190 output waveform with a transition frequency $f_b$ equal to the sum of the input frequencies, e.g. 122,622.5 Hz. This frequency $f_b$ waveform is received at gate input 180b and, if switch means 184 is open, provides a non-inverted waveform of the same frequency $f_b$ to the counting input 175b of the T-stage counter. Counter 175 may be a binary ripple counter which divides the frequency $f_b$ waveform by a factor of $2^T$ to generate a waveform, at counter output 175a, having a frequency slightly greater that the nominal local clock frequency. Illustratively, counter 175 is a 12-stage binary counter, with T=12, having an output frequency of about 29.94 Hz. for an input frequency $f_b$ of the aforementioned 122,622.5 Hz. The second counter output 175c was taken from an earlier counting stage, e.g. with T=8, to divide input frequency by $2^T = 256$. When switch means 184 is closed, gate input 180a receives a waveform having a frequency of about 480.87 Hz., and the counter output 175 waveform has a frequency, e.g. about 30.55 Hz., greater than the nominal local clock frequency. Thus, the crystal-controlled oscillator is converted, by frequency-arithmetic circuitry, including frequency-adders 180, 190 and 195 and frequency dividers 122 and 175, to provide a clock signal having a frequency slightly greater, or slightly less than, the number of desired local clock transitions per second; presence of the greater or lesser frequency depends on the condition of switch means 184.

The S-stage counter output 122c provides a relatively low frequency square waveform, (e.g. of a frequency of $f_5$ of about 19.55 Hz., if S=12 for division of the 80080 Hz. input frequency by $2^{12} = 4096$). The $f_5$ frequency square waveform is converted into a triangular wave at the output of integrator circuit 188 and applied to the non-inverting input of amplifier 186. If the inverting input of amplifier 186 is at ground potential, the presence of the triangular wave at the non-inverting input thereof causes the amplifier output voltage (and, therefore, the switch means input 184a voltage) to be positive for substantially half of some arbitrarily long time interval; accordingly, switch means 184 is closed approximately one-half of the time and is open approximately one-half of the time. As the input frequency to counter 175 is switched between substantially equally offset frequencies with substantially a 50% duty cycle, the frequency of the waveform at the counter output 175a has an average frequency set by the average input frequency, e.g. an average 30 transitions per second.

The voltage at the inverting input of amplifier 186 is not, however, necessarily held at a zero voltge magnitude, but is the magnitude of a voltage across integrating capacitor 168. The voltage across capacitor 168 is a function of the phase difference between the transition frequency of the received data and the local clock frequency signal. This phase difference is minimized by action of the phase detector formed by gate 155 and flip-flop elements 160 and 162.

The received data waveform, after "squaring up" in level detector 54, is applied to exclusive-OR gate 55. The transitions of the squared-up data waveform are immediately applied to the first gate input 155a and are applied, after a delay introduced by delay circuit 157, to second gate input 155b. As a result, each data waveform transition causes a positive pulse, of sufficient duration to clock flip-flop element 160, to appear at gate output 155c, with a pulse width determined by the time delay characteristics of delay network 157. When the carrier waveform is continuously transmitted with continuous alternations of the phase thereof in successive bit time intervals, a train of pulses will appear at the gate output 55c at the baud rate, e.g. 30 pulses per second. When data is transmitted, phase transmissions occur (for the illustrative phase-shift modulation) only when a first binary data value is followed by a second binary data value, and do not occur when the same binary data value is repeated, whereby some of the pulses in a sequence will be missing; timing is, however, otherwise unaffected. The presence of a pulse at gate output 155c is coupled to the clock C input of flip-flop element 160 and sets the Q output thereof to a high logic (positive voltage) level, while simultaneously setting the inverted $\overline{Q}$ output thereof to a low logic (negative voltage) level. These logic levels on the Q and $\overline{Q}$ outputs of flip-flop element 160 are maintained until the next positive-going transition of the local clock waveform, at counter output 175a, is coupled through network 170 to the reset R input of flip-flop logic element 60. This next-occurring local clock positive transition resets flip-flop element 160 such that the Q output returns to a low logic (negative voltage) level, while the $\overline{Q}$ output returns to a high logic (positive voltage) level. Integrating capacitor 168 is charged in a positive direction, through charging resistor 164, during the time that the Q output of flip-flop element 60 is at the high logic level; the increasing positive voltage across integrating capacitor 168 has an amplitude, therefor, established by the timing difference between the recovered data waveform transition producing the gate output 155c pulse and the next-subsequent positive transition of the local clock waveform.

The positive transition of the flip-flop element 160 $\overline{Q}$ output (occurring when flip-flop element 160 receives its reset R input pulse) is coupled to the clock C input of flip-flop element 162, setting the $\overline{Q}$ output thereof from its previous high logic level to a low logic level. At the next subsequent negative-going transition of the local clock waveform, which is inverted to a positive-going transition by action of inverter 58, the reset R input of flip-flop element 162 receives, via coupling network 171, the positive transition and resets the $\overline{Q}$ output to the high logic level. Therefore, the $\overline{Q}$ output of flip-flop element 162 is set to its low logic level (at which a negative polarity voltage appears at the Q output) responsive to a positive-going transition of the local clock waveform and is reset to a high logic (positive voltage) level at the next subsequent negative-going transition of the signal clock waveform. Accordingly, the negative-polarity low logic level is present at the $\overline{Q}$ output of flip-flop logic element 162 for one-half of a local clock cycle, e.g. one-half of the one-thirtieth second local clock, or one-sixtieth of a second, whenever flip-flop element 160 is triggered by a pulse from the recovered waveform at gate output 155c. During this substantially constant time interval, integrating capacitor 168 charges in a negative direction through charging resistor 166; the decrease in integrating capacitor voltage is thus by a substantially constant amount. Therefore, whenever a pulse appears at gate output 155C, the Q output of flip-flop element 160 starts to charge integrator capacitor 168 positively for a period between the start of the received data waveform pulse and the next positive local clock waveform transition, to charge the integrator capacitor to a variable positive magnitude, dependent upon the time interval. In the next subsequent half of a local clock waveform cycle, the integrating capacitor is negatively charged for a fixed time interval, whereby the average voltage across integrator capacitor is established by the variable positive charging current and fixed negative charging current supplied to the capacitor. If the gate output 155c pulse occurs exactly at the negative transition of the local clock waveform, first flip-flop element 160 will cause capacitor 168 to charge positive for exactly one-half of a local clock waveform cycle, e.g. one-sixtieth of a second. Since the second flip-flop element 162 also injects (whenever flip-flop element 160 has been previously clocked and reset) a negative charge for exactly one-half of the local clock waveform cycle, e.g. 1-60th of a second, there will be no net voltage change across integrating capacitor 168, indicative of exact synchronization of the local clock and recovered data waveforms. If, however, the gate output 155c pulses appear before the negative transitions of the local clock waveform, capacitance 168 will charge to a positive level, while if the gate output 155c pulses appear after the negative transitions of the local clock waveform, the voltage across capacitance 168 will charge to a negative level. The voltage across the capacitor is compared, in comparator 186, to the triangular waveform at the output of integrator 188. As the voltage across integrating capacitor 168 increases, switch means 184 will be closed for lesser percentages of the time interval for one repetition of the triangular waveform, lowering the average frequency of the local clock waveform at counter output 175a and closing the time difference between the local clock and recovered data waveforms to decrease and become synchronous. Similarly, if the voltage across capacitance 168 decreases, switch means 184 will be closed for a greater portion of a triangular wave time interval, raising the average frequency of the local clock waveform and again reducing the time difference between local clock and recovered data waveforms until the waveforms are in synchronization.

Thus, the baud clock frequency tends to oscillate about the condition in which positive baud clock transitions occur at exactly the time that the recovered data, at level detector output 54b, goes through a zero voltage level. Because the greatest and lowest baud clock transition frequencies, e.g. 30.055 and 29.94 Hz., are relatively close to the desired baud clock frequency, the residual error is relatively small. However, as there is considerable noise in the recovered data, the recovered data transitions are not perfectly regular and the baud synchronization circuit time constants are established to provide a very slow change in baud clock frequency, whereby the baud clock frequency tends to synchronize to the average recovered data waveform transition frequency.

The recovered data waveform at the output of second low-pass filter means 52 supplied to the input of I&DF means 60, while the baud clock waveform is applied to clock input 60a thereof. During each bit time interval, switch means 142 is open, allowing integrating capacitor 137 charged towards the data bit voltage level at filter input 60b. Level detector 140 provides an output, to the data D input of logic element 62, which is a high logic level or low logic level dependent upon the magnitude of the voltage across integrating capacitor 137, with respect to ground, at the end of each bit time interval. At the end of the bit time interval, coincident with the positive transition of the baud clock signal at clock input 62b, the data value at the output of level detector 140 is stored in flip-flop element 62 and is provided to recovered data output 10b' of the receiver. Simultaneously therewith, the positive transition of the baud clock waveform appears at filter input 60a and causes closure of switch means 142 for a short time interval determined by the time constant of capacitor 108 and shunt resistor 146. Discharge resistor 144 is now connected in parallel across integrating capacitor 137, discharging the capacitor to ground. Thus, the integrate-and-dump filter integrates the output of the second low-pass filter means for one bit time interval and, if the result is a positive logic level, a first binary digit is lodged in flip-flop element 62, while if the integrator voltage is negative, the remaining binary value data bit is lodged in flip-flop element 62.

While one presently preferred embodiment of my novel digital communications system receiver has been presented in detail herein, many modifications and variations will now become apparent to those skilled in the art. It is my intent, therefore, to be limited only by the scope of the appending claims and not by the specific details presented herein.

What is claimed is:

1. A receiver for recovering digital data modulated upon a carrier waveform in a digital communications system, comprising:
   means for receiving said carrier modulated by daid digital data;
   means for band-pass filtering the received modulated carrier;
   loop means receiving the band-pass filtered modulated carrier for providing a loop signal having a frequency essentially locked to the frequency of the received modulated carrier;
   means for mixing said loop signal with the bandpass-filtered modulated carrier to form a output signal responsive to the phase difference therebetween;
   means for low-pass filtering said mixing means output signal to recover the digital data from said modulated carrer;
   means receiving the low-pass-filtered output signal for recovering a baud synchronization signal therefrom, and including means for providing a pulse at each transition at the recovered digital data waveform received from said low-pass filtering means;
   means for providing a local clock waveform at first and second frequencies respectively greater than and less than the nominal frequency of the transitions of the recovered digital data waveform;

means for detecting the magnitude of the timing difference between said transition pulses and the transitions of said local clock waveform; and means for controlling the percentage of time during which each of said first and second frequencies is provided by said local clock waveform providing means responsive to the dectected transition timing difference information, to cause the local clock and digital data waveform transitions to occur essentially simultaneously; said local clock waveform being the local baud synchronizing signal.

2. The receiver of claim 1, further comprising means receiving said recovered digital data and said recovered baud synchronization signal for increasing the signal-to-noise ratio of said recovered digital data and for providing said recovered digital data in accurately time relationship to said recovered synchronization signal.

3. The receiver of claim 2, wherein said signal-to-noise ratio increasing means includes means for integrating the data value of a bit of the recovered digital data during a first portion of each cycle of the baud synchronization signal; and latch means for storing the value of the integrated data value for the associated data bit, at the end of said first baud synchronization signal portion, and for providing the stored data bit value as the recovered digital data information for the time interval of that received digital data bit.

4. The receiver of claim 3, wherein the integrating means comprises:
an integrating capacitance;
a resistive element receiving the low-pass-filtered output signal for charging said integrating capacitor in accordance with the level of said output signal; and
a level detector having an input coupled across the integrating capacitance and an output at which first and second binary logic levels respectively appear responsive to the voltage at said level detector input being respectively greater than and less than a predetermined level.

5. The receiver of claim 4, wherein said integrating means further comprises a discharge resistance element; and switch means for connecting said discharge resistance element to discharge said integrating capacitance during another period of said recovered baud synchronization signal after said first portion thereof.

6. The receiver of claim 1, further comprising means for detecting the level of the low-pass-filtered output signal to provide a rapidly transitioning recovered digital data waveform to said baud synchronization signal recovering means.

7. The receiver of claim 1, wherein said pulse providing means comprises: means for delaying each transition of the recovered digital data waveform by a preselected value; and an exclusive-OR gate having a first input receiving the delayed recovered digital data waveform transitions, a second input receiving the recovered digital data waveform transitions without delay, and an output at which a pulse appears for each transition of the recovered digital data waveform.

8. The receiver of claim 1, wherein said first and second frequency providing means includes:
first means for providing a signal having a frequency at an integer multiple of said second frequency;
means for dividing the frequency of an input waveform by said integer to provide a first frequency output signal and for dividing the frequency of said input waveform by another integer multiple less than said first integer multiple to provide another frequency output signal;
means for adding the frequency of the signal from said first means to the frequency of a selected signal to provide the input waveform for said dividing means; and switch means for selectively connecting said another frequency signal to said frequency-adding means under control of said controlling means; said second frequency being the sum of said first frequency and said another frequency, after division by said first integer.

9. The receiver of claim 1, wherein said detecting means comprises:
a capacitive integrating element;
first means for providing a flow of electrical charge into said integrating element during a time interval commencing with the appearance of a pulse from said pulse providing means and terminating at a selected transition of said local clock waveform; and
second means for removing a flow of electrical charge from said integrating element commencing with said selected transition of said local clock waveform and terminating at the next subsequent local clock waveform transition.

10. The receiver of claim 9, wherein said first means comprises a first resistance element connected to said integrating element; and a first flip-flop logic element having a true Q output providing a voltage to said first resistance element, an inverted $\overline{Q}$ output, a clock input receiving the pulses from said pulse providing means for actuating said true Q and inverted $\overline{Q}$ outputs respectively to a positive and negative polarity voltage level, and a reset input responding to said selected transition of the local clock waveform for resetting the true Q and inverted $\overline{Q}$ outputs respectively to the negative polarity and positive polarity voltage levels.

11. The receiver of claim 10, wherein said second means comprises a second resistive element coupled to said integrating element; and a second flip-flop logic element having an output providing a voltage to said second resistance element, a clock input actuating said output to said negative-polarity voltage level responsive to the transition of said first flip-flop logic element inverted $\overline{Q}$ output from said negative-polarity voltage level to said positive-polarity voltage level, and a reset input actuating said second flip-flop logic element output to the positive-polarity voltage level responsive to said next subsequent transition of said local clock waveform.

12. The receiver of claim 11, wherein said time percentage controlling means comprises means for generating a triangular waveform having a frequency less than the frequency of said local clock waveform; and comparator means for respectively closing and opening said switch means responsive to the instantaneous value of said triangular waveform being respectively greater than and less than the value of the voltage across said integrating element.

13. The receiver of claim 1, wherein said bandpas filtering means comprises at least one resistance-capacitance operational amplifier active band-pass filter connected in series between said receiving means and an input of each of said loop and mixing means.

14. The receiver of claim 1, wherein said mixing means is an essentially linear mixer.

15. The receiver of claim 14, wherein said essentially linear mixer comprises means for inverting the band-pass-filtered carrier waveform; and means for cyclically alternating between the band-pass-filtered carrier waveform and the inverted band-pass-filtered carrier waveform at a rate established by the frequency of said loop signal to provide the cyclically alternating signal as said output signal.

16. The receiver of claim 1, wherein said low-pass filtering means comprises at least one resistance-capacitance operational amplifier active low-pass filter connected to an output of said mixing means.

17. The receiver of claim 1, wherein said loop means comprises:
  means for mixing said band-pass filtered received carrier signal and said loop signal to provide another signal;
  means for low-pass filtering said another signal; and
  oscillator means having an input receiving the low-pass-filtered another signal for providing said loop signal, at a frequency controlled by the magnitude of said low-pass-filtered another signal, to said another signal mixing means.

18. The receiver of claim 17, wherein said another signal mixing means is an essentially linear mixer.

19. The receiver of claim 18, wherein said essentially linear mixer comprises means for inverting the band-pass-filtered carrier waveform; and means for cyclically alternating between the band-pass-filtered carrier waveform and the inverted band-pass-filtered carrier waveform at a rate established by the frequency of said loop signal to provide said another signal at an output thereof.

20. The receiver of claim 18, wherein said low-pass-filtering means comprises at least one resistance-capacitance operational amplifier active low-pass filter receiving said output signal of said another signal mixing means and having an output connected to said oscillator means input.

21. The receiver of claim 17, wherein said carrier is differential-phase-shift modulated by said digital data, said loop means further comprising means for inverting the phase of the loop signal output from said oscillator means responsive to each reversal of the phase of the modulated carrier waveform.

22. The receiver of claim 1, further comprising means for shifting the phase of said loop signal prior to mixing of said loop signal with said received carrier waveform in said mixing means.

23. The receiver of claim 22, wherein the amount of phase shift of said loop signal is substantially equal to 90°.

* * * * *